(12) United States Patent
Martin (10) Patent No.: US 9,989,139 B2
(45) Date of Patent: Jun. 5, 2018

(54) AXLE ASSEMBLY HAVING A CLUTCH COLLAR ACTUATOR

(71) Applicant: ArvinMeritor Technology, LLC, Troy, MI (US)

(72) Inventor: Robert J. Martin, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 438 days.

(21) Appl. No.: 14/742,739

(22) Filed: Jun. 18, 2015

(65) Prior Publication Data

US 2016/0369879 A1 Dec. 22, 2016

(51) Int. Cl.
| | |
|---|---|
| *F16H 48/24* | (2006.01) |
| *F16H 48/22* | (2006.01) |
| *B60K 17/16* | (2006.01) |
| *B60K 23/04* | (2006.01) |
| *F16H 48/32* | (2012.01) |
| *F16H 48/08* | (2006.01) |

(52) U.S. Cl.
CPC ........... *F16H 48/22* (2013.01); *B60K 17/165* (2013.01); *B60K 23/04* (2013.01); *F16H 48/24* (2013.01); *F16H 48/32* (2013.01); *B60K 2023/046* (2013.01); *B60Y 2400/421* (2013.01); *B60Y 2410/10* (2013.01); *F16H 48/08* (2013.01)

(58) Field of Classification Search
CPC ........ F16H 48/24; B60K 17/165; B60K 23/04
See application file for complete search history.

(56) References Cited

U.S. PATENT DOCUMENTS

| | | | | |
|---|---|---|---|---|
| 5,673,777 | A * | 10/1997 | Ziech | F16H 48/08 192/108 |
| 9,022,892 | B1 * | 5/2015 | Marsh, Jr. | F16H 48/11 475/228 |
| 2002/0198076 | A1 * | 12/2002 | Bryson | F16H 48/08 475/231 |
| 2007/0199404 | A1 * | 8/2007 | Mason | B60K 17/20 74/607 |
| 2008/0269002 | A1 * | 10/2008 | Chiba | B60K 17/3462 475/231 |
| 2010/0041506 | A1 * | 2/2010 | Cooper | F16H 48/08 475/223 |

FOREIGN PATENT DOCUMENTS

| | | |
|---|---|---|
| CN | 2635406 Y | 8/2004 |
| CN | 102358175 A | 2/2012 |
| EP | 1203901 A2 | 5/2002 |

OTHER PUBLICATIONS

The State Intellectual Property Office of China, First Office Action for the corresponding Chinese Patent Application No. 201610048308.2 dated Jan. 22, 2018.
European Patent Office, Extended European Search Report for the corresponding European Patent Applicatio No. 16162758.3 dated Dec. 12, 2016.

* cited by examiner

*Primary Examiner* — Derek D Knight
(74) *Attorney, Agent, or Firm* — Brooks Kushman P.C.

(57) ABSTRACT

An axle assembly having a bearing cap, an actuator, and a fork. The bearing cap may be disposed in a cavity defined by an axle housing and a differential carrier and may be fixedly disposed on the differential carrier. The fork may be disposed in the cavity and may couple the actuator to a clutch collar.

20 Claims, 3 Drawing Sheets

AXLE ASSEMBLY HAVING A CLUTCH COLLAR ACTUATOR

TECHNICAL FIELD

This disclosure relates to an axle assembly that may have an actuator that may be provided with a differential bearing cap and that may actuate a clutch collar.

BACKGROUND

A differential locking system is disclosed in U.S. Patent Publication No. 2007/0199404.

SUMMARY

In at least one embodiment, an axle assembly is provided. The axle assembly may include first and second output shafts, a differential unit, a clutch collar, a bearing, a differential carrier, a bearing cap, and a fork. The differential unit may control rotation of the first output shaft with respect to the second output shaft. The clutch collar may be movably disposed on the first output shaft and may selectively engage the differential unit. The bearing may rotatably support the differential unit. The differential carrier may support the bearing. The bearing cap may be fixedly disposed on the differential carrier and may include a first portion and a second portion. The first portion may cooperate with the differential carrier to define an opening that may receive the bearing. The second portion may extend from the first portion and may have a chamber that may receive an actuator that may actuate the clutch collar. The fork may operatively connect the actuator to the clutch collar.

In at least one embodiment, an axle assembly is provided. The axle assembly may include first and second output shafts, a differential unit, a clutch collar, a bearing, a differential carrier, a bearing cap, and a fork. The differential unit may control rotation of the first output shaft with respect to the second output shaft. The clutch collar may be movably disposed on the first output shaft. The bearing may rotatably support the differential unit. The differential carrier may support the bearing. The bearing cap may be fixedly disposed on the differential carrier and may include a first portion, a second portion, and an anti-rotation feature. The first portion may cooperate with the differential carrier to define an opening that may receive the bearing. The second portion may extend from the first portion and may receive an actuator that may extend along an actuator axis and that may actuate the clutch collar. The anti-rotation feature may extend away from the first portion. The fork may operatively connect the actuator to the clutch collar. The fork may have a fork opening that may receive the anti-rotation feature and the anti-rotation feature may limit rotation of the fork about the actuator axis.

In at least one embodiment, an axle assembly is provided. The axle assembly may include an axle housing, a differential carrier, a differential unit, a clutch collar, a bearing, a bearing cap, an actuator, and a fork. The differential carrier may be disposed on the axle housing. The axle housing and the differential carrier may cooperate to define a cavity. The differential unit may be disposed in the cavity and may control rotation of a first output shaft with respect to a second output shaft. The clutch collar may be disposed in the cavity and may be movably disposed on the first output shaft. The bearing may be disposed in the cavity on the differential carrier and may rotatably support the differential unit. The bearing cap may be disposed in the cavity and may be fixedly disposed on the differential carrier. The bearing cap may include a first portion and a second portion. The first portion may cooperate with the differential carrier to define an opening that may receive the bearing. The second portion may extend from the first portion and may have a chamber. The actuator may be received within the chamber. The fork may be disposed in the cavity and may couple the actuator to the clutch collar.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
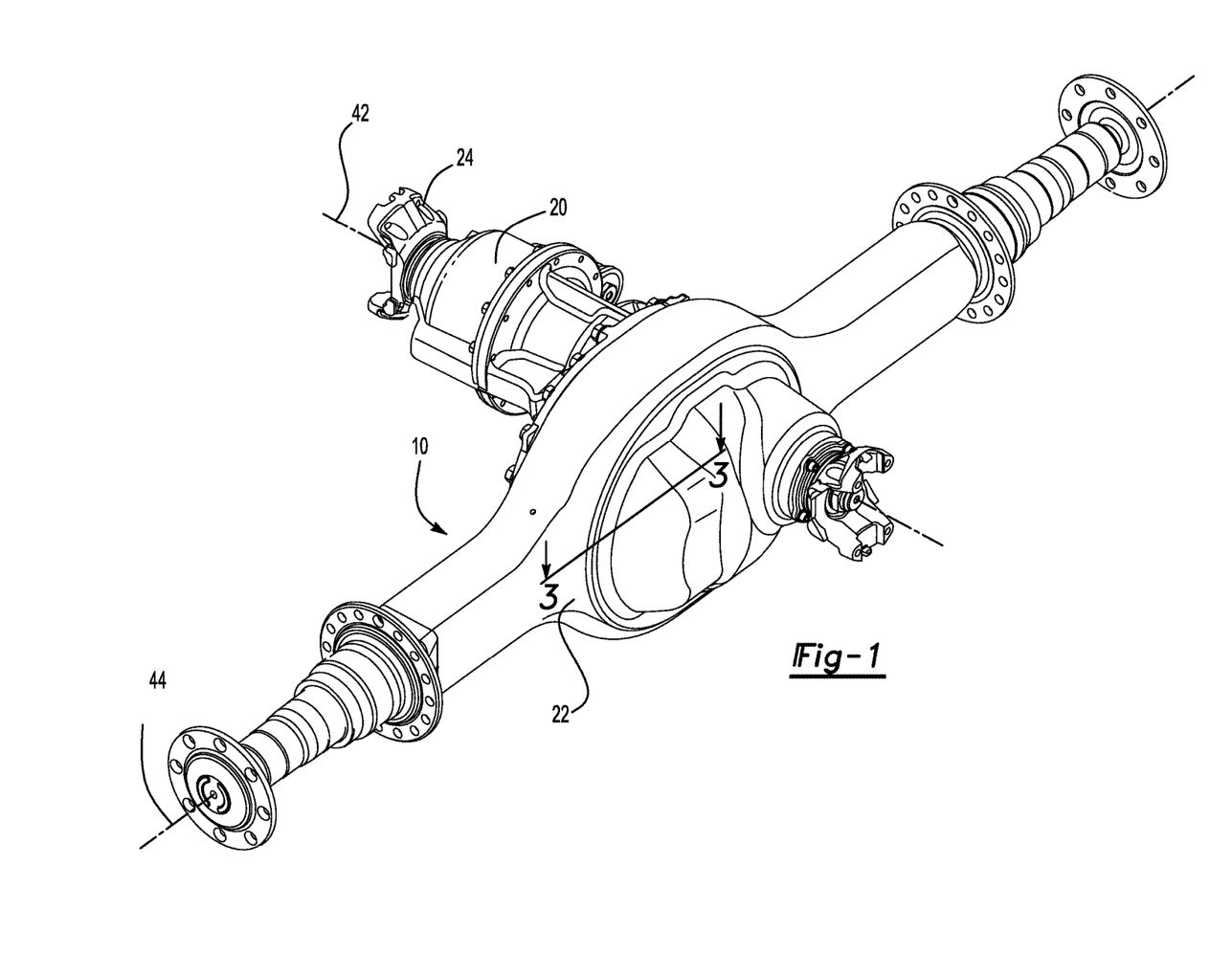
FIG. 1 is a perspective view of an axle assembly.
Figure 2:
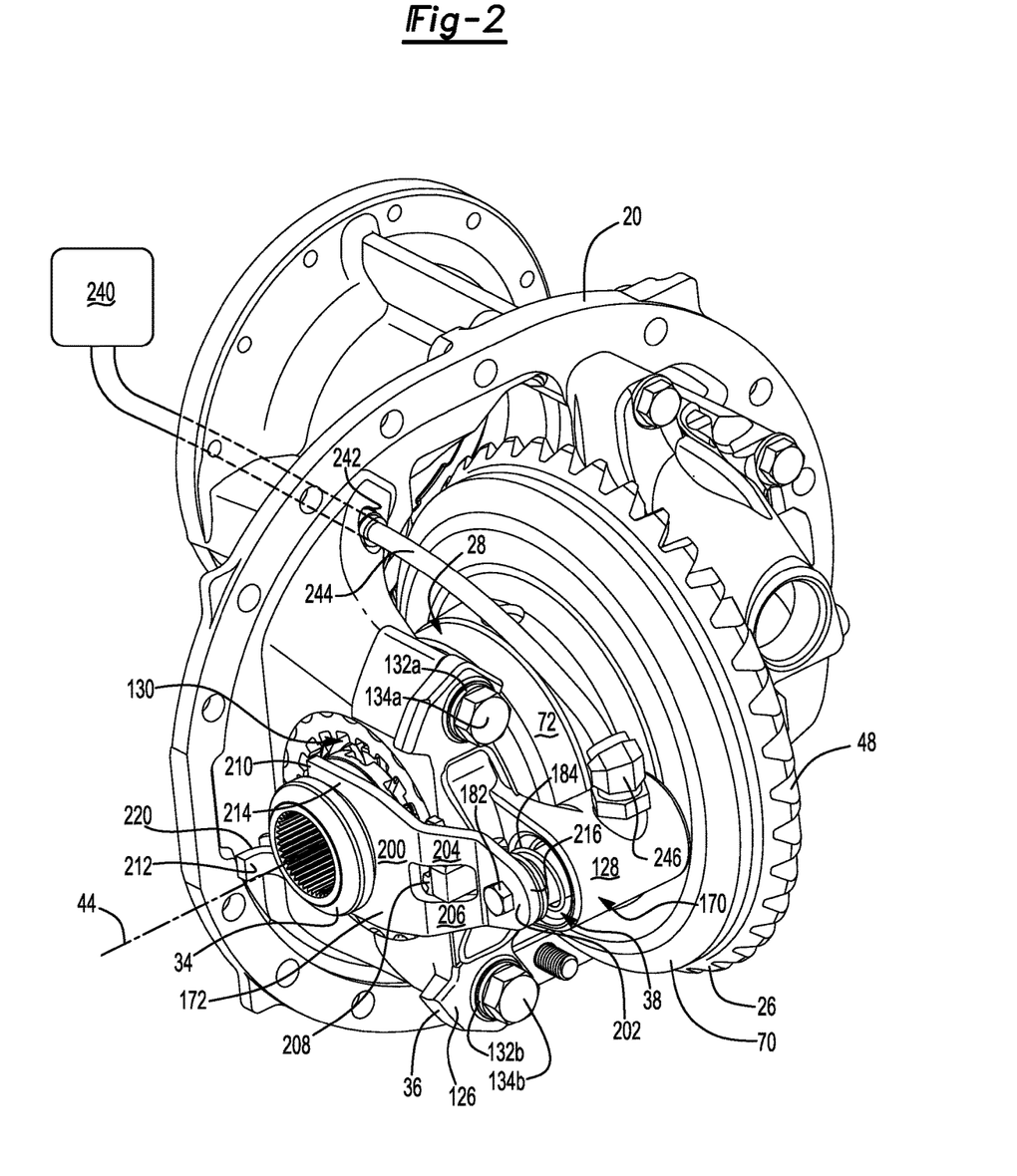
FIG. 2 is a perspective view of a differential carrier of the axle assembly.
Figure 3:
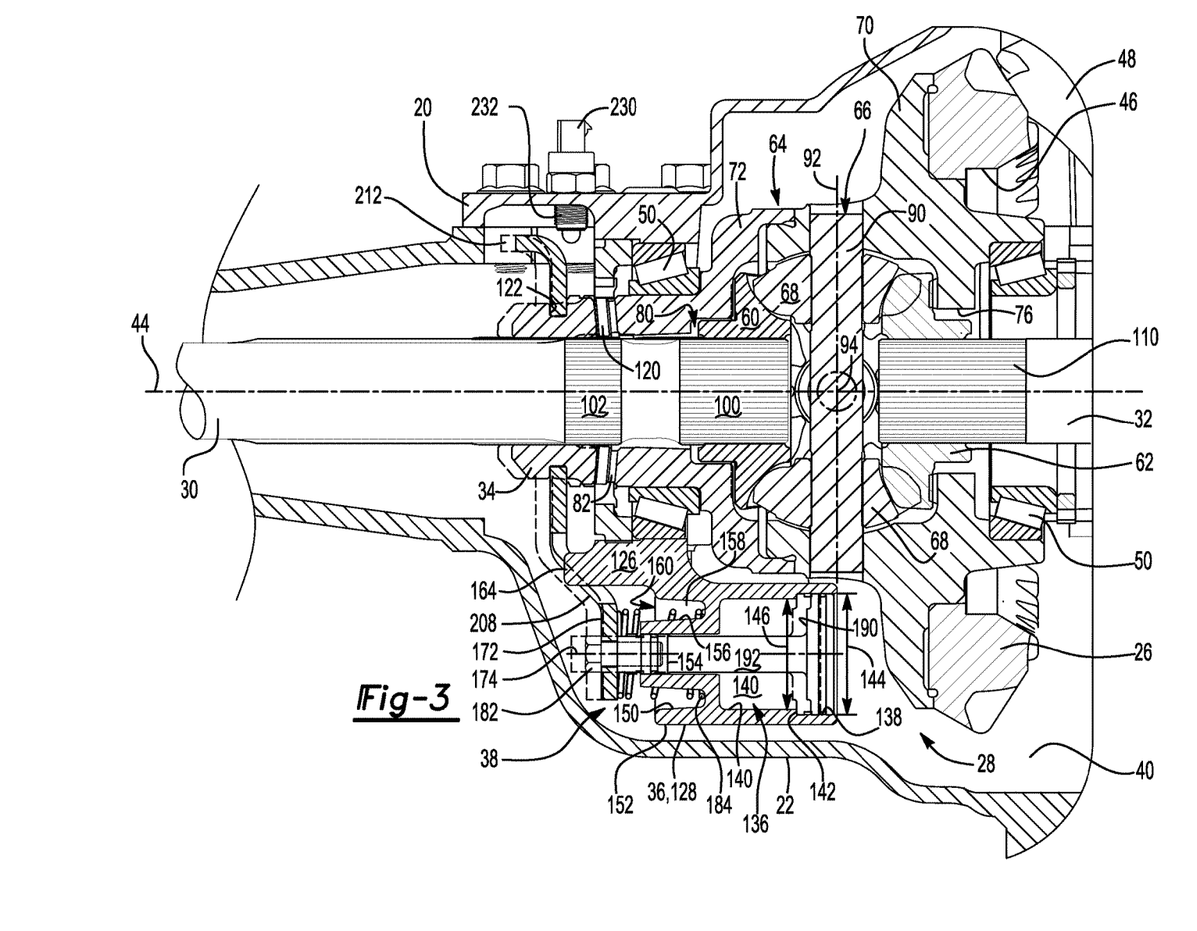
FIG. 3 is a section view of the axle assembly along section line 3-3.

Referring to FIG. 1, an exemplary axle assembly 10 is shown. The axle assembly 10 may be provided with a vehicle, such as a motor vehicle like a truck, bus, farm equipment, military transport or weaponry vehicle, or cargo loading equipment for land, air, or marine vessels. The axle assembly 10 may be configured to provide torque to at least one associated wheel assembly. Referring to FIGS. 1-3, the axle assembly 10 may include a differential carrier 20, an axle housing 22, an input shaft 24, a ring gear 26, a differential unit 28, a first output shaft 30, a second output shaft 32, a clutch collar 34, a bearing cap 36, and a clutch collar actuator mechanism 38.

Referring to FIG. 1, the differential carrier 20 and the axle housing 22 may cooperate to define a cavity 40 that may receive various components of the axle assembly 10. The differential carrier 20 may be mounted to the axle housing 22 and may support the differential unit 28 and its associated components to facilitate assembly of the axle assembly 10. The differential carrier 20 and/or the axle housing 22 may facilitate mounting of the axle assembly 10 to the vehicle.

The input shaft 24 may receive torque from a power source. For example, the input shaft 24 may be operatively coupled to a transmission, a transfer case, or another axle assembly that may receive torque from a motor or engine. In at least one embodiment, the input shaft 24 may extend along and may rotate about a first axis 42. The input shaft 24 may be operatively connected to the ring gear 26 and may provide torque to the ring gear 26.

Referring to FIGS. 2 and 3, the ring gear 26 may be configured to rotate about a second axis 44. The ring gear 26 may have a center hole 46 and a set of teeth 48. The center hole 46 may extend around the second axis 44. The set of teeth 48 may be arranged around the center hole 46 and may engage and mate with corresponding teeth on another component, such as a pinion gear that may be associated with the input shaft 24.

The differential unit 28 may be disposed in the cavity 40 defined by the differential carrier 20 and the axle housing 22. The differential unit 28 may support the ring gear 26. The differential unit 28 may be rotatably supported by one or more bearings 50 that may be disposed within the cavity. The bearing 50 may be supported by the bearing cap 36 of the differential carrier 20 and may be a roller bearing that may include a plurality of rolling elements, such as balls, cones, or rollers that may be disposed between an inner race and an outer race. The differential unit 28 may be configured to control rotation of the first output shaft 30 with respect to the second output shaft 32. For example, the differential unit 28 may permit the first and second output shafts 30, 32 to rotate at different speeds or inhibit the first and second output shafts 30, 32 from rotating at different speeds depending on the position of the clutch collar 34. As is best shown in FIG. 3, the differential unit 28 may be generally disposed in the center hole 46 of the ring gear 26. In at least one embodiment, the differential unit 28 may include a first output gear 60, a second output gear 62, a case 64, a spider 66, and one or more pinion gears 68.

The first output gear 60 may be disposed proximate the first output shaft 30. For example, the first output gear 60 may extend around the second axis 44 and may have a center bore. The center bore may have a spline that may receive and engage a corresponding spline on the first output shaft 30 to inhibit rotation of the first output gear 60 with respect to the first output shaft 30. The first output gear 60 may include a set of teeth that may be arranged on a side or face of the first output gear 60 that faces toward the spider 66 and one or more pinion gears 68.

The second output gear 62 may be spaced apart from and disposed opposite the first output gear 60. The second output gear 62 may have substantially the same configuration as the first output gear 60 in one or more embodiments. The second output gear 62 may be disposed proximate the second output shaft 32 and may extend around the second axis 44 and may have a center bore. The center bore may have a spline that may receive and engage a corresponding spline on the second output shaft 32 to inhibit rotation of the second output gear 62 with respect to the second output shaft 32. The second output gear 62 may also include a set of teeth that may be arranged on a side or face of the second output gear 62 that faces toward the spider 66 and one or more pinion gears 68.

The case 64 may receive various components of the differential unit 28. The case 64 may be spaced apart from the differential carrier 20, the axle housing 22, the first output shaft 30, and the second output shaft 32. In at least one embodiment, the case 64 may include a first case portion 70 and a second case portion 72.

The first case portion 70 may support the ring gear 26. The ring gear 26 may be fixedly disposed on the first case portion 70. In addition, the first case portion 70 may receive and may be rotatably supported by a bearing 50. As such, the ring gear 26 and the first case portion 70 may rotate together about the second axis 44. The first case portion 70 may include an opening 76. The opening 76 may be configured as a through hole that may generally extend along the second axis 44. A portion of the first output shaft 30 and/or the second output shaft 32 may extend into the opening 76. The second output gear 62 may be rotatably disposed in the opening 76 and may rotate about the second axis 44 with respect to the first case portion 70.

The second case portion 72 may be disposed proximate and may engage the first case portion 70. The second case portion 72 may be fixedly disposed on the first case portion 70 in any suitable manner, such as with one or more fasteners, a weld, or the like. The second case portion 72 may be received in and may engage the bearing 50. In at least one embodiment, the second case portion 72 may include an opening 80 and a case gear 82.

The opening 80 may be configured as a through hole that may extend along the second axis 44. The first output shaft 30 may extend through the opening 80. In addition, the first output gear 60 may be rotatably disposed in the opening 80 such that the first output gear 60 may rotate about the second axis 44 with respect to the second case portion 72.

The case gear 82 may include a set of teeth that may be arranged on a side or face of the second case portion 72. The teeth of the case gear 82 may face towards the clutch collar 34. In addition, the teeth of the case gear 82 may be radially disposed with respect to the second axis 44 and arranged around the opening 80. The case gear 82 may selectively engage corresponding teeth on the clutch collar 34 as will be discussed in more detail below.

The spider 66 may be disposed in the case 64 and may be configured to rotate about the second axis 44. The spider 66 may rotate about the second axis 44 with respect to the first and/or second output shafts 30, 32. The spider 66 may also include a set of pins 90 that may extend away from the second axis 44. In at least one embodiment, the pins 90 may be arranged along a first spider axis 92 and/or a second spider axis 94, which may be disposed substantially perpendicular to the second axis 44. Ends of the pins 90 may be received in the case 64 and may be spaced apart from the differential carrier 20 so as not to interfere with rotation of the differential unit 28. The pins 90 may be received between the first case portion 70 and the second case portion 72.

A pinion gear 68 may be rotatably disposed on each pin 90. Each pinion gear 68 may be generally disposed in the case 64 and may be retained on corresponding pins with a fastener, such as a thrust washer that may be coupled to or may engage the case 64. A pinion gear 68 may rotate about a corresponding pin 90 and corresponding spider axis 92, 94. Each pinion gear 68 may include a set of teeth that mate with the first output gear 60 and the second output gear 62.

The first output shaft 30 may help connect the axle assembly 10 to a vehicle wheel. For example, the first output shaft 30 may extend along the second axis 44 from the differential unit 28 towards a vehicle wheel. The first output shaft 30 may include a first spline 100. The first spline 100 may be disposed near an end of the first output shaft 30 and may mate with a spline on the first output gear 60. As such, the first output shaft 30 may be inhibited from rotating with respect to the first output gear 60. The second spline 102 may be spaced apart from the first spline 100 and may mate with a corresponding spline on the clutch collar 34. As such, the clutch collar 34 may slide along the first output shaft 30 but may be inhibited from rotating with respect to the second output shaft 32.

The second output shaft 32 may help connect the axle assembly 10 to another vehicle wheel. For example, the second output shaft 32 may extend from an opposite side of the differential unit 28 from the first output shaft 30 and may extend along the second axis 44 from the differential unit 28 towards a vehicle wheel. The second output shaft 32 may be spaced apart from the first output shaft 30 and may include a spline 110. The spline 110 may be disposed near an end of the second output shaft 32 and may mate with a spline on the second output gear 62. As such, the second output shaft 32 may be inhibited from rotating with respect to the second output gear 62.

The clutch collar 34 may be disposed within the cavity 40 defined by the differential carrier 20 and the axle housing 22. The clutch collar 34 may be moveably disposed on the first output shaft 30. More specifically, the clutch collar 34 may be disposed on the first output shaft 30 and may be configured to move or slide along the second axis 44. The clutch collar 34 may be generally ring-shaped and may include a gear portion 120 and an annular groove 122.

The gear portion 120 may include a set of teeth that may be arranged on a side or face of the clutch collar 34 that faces toward the case 64. The teeth of the gear portion 120 may selectively engage the case gear 82 of the second case portion 72. More specifically, the gear portion 120 may mate or mesh with the teeth of the case gear 82 when the clutch collar 34 is in a locked position and may not mate or mesh with the teeth of the case gear 82 when the clutch collar 34 is in an unlocked position. In the locked position, the clutch collar 34 may couple the case 64 to the first output shaft 30 such that the case 64 and first output shaft 30 rotate together about the second axis 44. As such, the first output shaft 30 and the second output shaft 32 may rotate together and may not rotate at different velocities. In the unlocked position, the clutch collar 34 gear portion 120 may not mate or mesh with the teeth of the case gear 82 and thus the clutch collar 34 does not couple the case 64 to the first output shaft 30. As such, the first output shaft 30 and the second output shaft 32 may not rotate together and may rotate at different velocities.

The annular groove 122 may be spaced apart from the gear portion 120. The annular groove 122 may extend continuously around the clutch collar 34 and may receive a portion of the clutch collar actuator mechanism 38 as will be described in more detail below.

Referring to FIGS. 2 and 3, the bearing cap 36 may be disposed within the cavity 40 defined by the differential carrier 20 and the axle housing 22. The bearing cap 36 may cooperate with the differential carrier 20 to receive and help secure the bearing 50. The bearing cap 36 may be fixedly disposed on the differential carrier 20. In at least one embodiment, the bearing cap 36 may include a first portion 126 and a second portion 128.

The first portion 126 may cooperate with the differential carrier 20 to define an opening 130 that receives the bearing 50. The first portion 126 may be disposed between the differential carrier 20 and the second portion 128.

The first portion 126 may include first and second fastener holes 132a, 132b. The first and second fastener holes 132a, 132b may be disposed on opposite sides of the bearing 50 and on opposite sides of the second portion 128. The first and second fastener holes 132a, 132b may receive first and second fasteners 134a, 134b, such as bolts, that may couple the bearing cap 36 to the differential carrier 20.

The second portion 128 may extend from the first portion 126. The second portion 128 may be integral with the first portion 126 or may be provided as a separate component that may be attached to the first portion 126. The second portion 128 may be disposed between the first and second fastener holes 132a, 132b and the first and second fasteners 134a, 134b. In addition, the second portion 128 may extend away from the differential carrier 20 such that the first portion 126 is disposed between the differential carrier 20 and the second portion 128.

As is best shown in FIG. 3, the second portion 128 may have a chamber 136 that may receive at least a portion of the clutch collar actuator mechanism 38. The chamber 136 may be defined by a first chamber wall portion 138, a second chamber wall portion 140, and a step surface 142.

The first chamber wall portion 138 may be disposed proximate an end of the chamber 136. The first chamber wall portion 138 may be disposed opposite a fork and may receive and engage a piston as will be discussed in more detail below. The first chamber wall portion 138 may have a first diameter 144.

The second chamber wall portion 140 may be disposed in the chamber 136 between the first chamber wall portion 138 and an opposite end of the second portion 128. The second chamber wall portion 140 may have a second diameter 146 that may be less than the first diameter 144.

The step surface 142 may extend from the first chamber wall portion 138 to the second chamber wall portion 140. The step surface 142 may extend substantially perpendicular with respect to the first chamber wall portion 138 and or the second chamber wall portion 140 in one or more embodiments and may limit a travel distance of a piston.

The second portion 128 may also have a first inner surface 150, a first outer surface 152, a second inner surface 154, a second outer surface 156, and a groove 158.

The first inner surface 150 may face toward the second outer surface 156. The first inner surface 150 may cooperate with the second outer surface 156 to define the groove 158. The first inner surface 150 may extend around or may be disposed about an actuator axis as will be discussed in more detail below.

The first outer surface 152 may be disposed opposite the first inner surface 150 and the groove 158. The first outer surface 152 may extend around the first inner surface 150 and may extend around an actuator axis as will be discussed in more detail below.

The second inner surface 154 may face toward an actuator axis and may extend from the chamber 136. The second inner surface 154 may at least partially define a hole that may receive a portion of a piston as will be discussed in more detail below.

The second outer surface 156 may be disposed opposite the second inner surface 154. In addition, the second outer surface 156 may extend around the second inner surface 154 and may be disposed between the first inner surface 150 and the second inner surface 154.

The groove 158 may be disposed between and may be defined by the first inner surface 150 and the second outer surface 156. The groove 158 may have an open end 160 that may face away from the chamber 136. In addition, the groove 158 may be spaced apart from and may not extend to the chamber 136.

The first portion 126 may include an anti-rotation feature 164. The anti-rotation feature 164 may extend away from a portion of the bearing cap 36. The anti-rotation feature 164 may be configured as a protrusion or finger and may extend substantially parallel to the second axis 44. The anti-rotation feature 164 may be disposed between the clutch collar 34 and the clutch collar actuator mechanism 38. The anti-rotation feature 164 may be disposed between the second portion 128 and the first output shaft 30. The anti-rotation feature 164 may help position and inhibit rotation of the clutch collar actuator mechanism 38 during assembly, removal, or maintenance, as will be discussed in more detail below.

The clutch collar actuator mechanism 38 may facilitate the positioning of the clutch collar 34 along the second axis 44 relative to the first output shaft 30. The clutch collar actuator mechanism 38 may be disposed within the cavity 40 defined by the differential carrier 20 and the axle housing 22. Providing the clutch collar actuator mechanism 38 inside the axle assembly 10 may help reduce package space of the axle assembly 10 and may help improve clearance to other vehicle components. The clutch collar actuator mechanism 38 may be disposed proximate and may engage the second portion 128. The combination of the clutch collar 34 and the clutch collar actuator mechanism 38 may collectively be referred to as a driver controlled differential lock ("DCDL"). In at least one embodiment, the clutch collar actuator mechanism 38 may include an actuator 170 and a fork 172.

The actuator 170 may be configured to actuate the fork 172 and the clutch collar 34. The actuator 170 may be completely disposed inside the axle assembly 10. For example, the actuator 170 may be at least partially received within the chamber 136 and may be moveably disposed in the chamber 136 of the second portion 128. In at least one embodiment, the actuator 170 may extend along and may move along an actuator axis 174. The actuator 170 may be of any suitable type, such as a pneumatic, hydraulic, vacuum, mechanical, or electromechanical actuator. In at least one embodiment, the actuator 170 may include a piston 180, a fork mounting feature 182, and a biasing member 184.

The piston 180 may include a piston head 190 and a piston shaft 192. The piston head 190 and the piston shaft 192 may be fixedly positioned with respect to each other and may be movably disposed within the chamber 136. The piston head 190 and the piston shaft 192 may move in unison when the clutch collar actuator mechanism 38 is actuated. The piston 180 may be provided with a pair of sealing rings, such as an o-ring, to form a pressurized vessel. A first sealing ring may be disposed about the piston head 190. The first sealing ring may sealingly engage the first chamber wall portion 138. A second sealing ring may be disposed about the piston shaft 192. The second sealing ring may sealingly engage the second inner surface 154.

The piston head 190 may be configured to engage the step surface 142 when the clutch collar actuator mechanism 38 is in the extended position. The extended position may correspond to a disengaged or off position of the clutch collar actuator mechanism 38. The engagement of the piston head 190 with the step surface 142 may inhibit further motion of the piston 180 to the left from the perspective shown in FIG. 3.

The fork mounting feature 182 may operatively couple the piston 180 to the fork 172. The fork mounting feature 182 may have any suitable configuration. For instance, the fork mounting feature may be a fastener, such as a bolt. The fork mounting feature 182 may extend along the actuator axis 174, may extend through the fork 172 and may couple the piston shaft 192 to the fork 172.

The biasing member 184 may extend between the second portion 128 and the fork 172. The biasing member 184 may be at least partially received within the groove 158. The biasing member 184 may at least partially extend around the fork mounting feature 182 and the piston 180. The biasing member 184 may facilitate translation of the fork 172 with respect to the actuator 170 along the actuator axis 174. The biasing member 184 may exert a biasing force on the fork 172 such that the clutch collar 34 is biased towards disengagement from the differential unit 28, or to the left from the perspective shown in FIG. 3.

Referring primarily to FIG. 2, the fork 172 may be disposed within the cavity 40 defined by the differential carrier 20 and the axle housing 22. The fork 172 may operatively connect the actuator 170 to the clutch collar 34. In at least one embodiment, the fork 172 may include a first fork portion 200, a second fork portion 202, a first arm 204, a second arm 206, and a fork opening 208.

The first fork portion 200 may be disposed proximate a first end 210 of the fork 172 that may be disposed proximate the clutch collar 34. The first fork portion 200 may be spaced apart from and disposed opposite the second fork portion 202. As is best shown in FIG. 2, the first fork portion 200 may be disposed substantially parallel to but may not be coplanar with the second fork portion 202. In one or more embodiments, the first fork portion 200 may be substantially coplanar with the second fork portion 202 such that the fork 172 may form a straight fork. The first fork portion 200 may include a first prong 212 and a second prong 214.

The first prong 212 may be disposed proximate and may engage the clutch collar 34. For instance, the first prong 212 may be received within the annular groove 122 of the clutch collar 34. The first prong 212 may include a detection feature 220.

The detection feature 220 may be disposed at an end of the first prong 212. The detection feature 220 may have any suitable configuration. For example, the detection feature 220 may be configured as an arm, a bolt, or a pin that may extend from the first prong 212 or may be integrally formed with the first fork portion 200.

The second prong 214 may be disposed opposite the first prong 212. The second prong 214 may be disposed substantially parallel to the first prong 212. The second prong 214 may be disposed proximate and may engage the clutch collar 34. The second prong 214 may be received within the annular groove 122 of the clutch collar 34.

The second fork portion 202 may be disposed proximate a second end 216 of the fork 172. The second fork portion 202 may be disposed on an opposite side of the fork opening 208 from the first fork portion 200. The second fork portion 202 may include an opening that may receive the fork mounting feature 182.

The first arm 204 and the second arm 206 may extend from the first fork portion 200 to the second fork portion 202. The first arm 204 and the second arm 206 may be spaced apart from each other and may be disposed on opposite sides of the fork opening 208. In one or more embodiments, the first and second arms 204, 206 may define a ramp or a step between the first fork portion 200 and the second fork portion 202. As such, the first fork portion 200 may be offset from and may not be coplanar with the second fork portion 202. In one or more embodiments, the first and second arms 204, 206 may be disposed substantially coplanar with the first fork portion 200 and the second fork portion 202.

The fork opening 208 may be disposed between and may be at least partially defined by the first fork portion 200, the second fork portion 202, the first arm 204 and the second arm 206. The fork opening 208 may be configured to receive the anti-rotation feature 164 such that the anti-rotation feature 164 limits rotation of the fork 172 about actuator axis 174 to facilitate assembly. As such, the anti-rotation feature 164 may allow the axle assembly 10 be provided without a caging screw during assembly or removal of the differential carrier 20 from the axle housing 22.

Referring to FIG. 3, a sensor 230 may extend at least partially through a sensor hole 232 in the differential carrier 20. The sensor 230 may be configured to detect a position of the clutch collar actuator mechanism 38. The sensor 230 may be of any suitable type and may or may not contact the clutch collar actuator mechanism 38. In one or more embodiments, the sensor 230 may detect the position of a portion of the fork 172. More specifically, the sensor 230 may detect the position of the detection feature 220. For instance, the sensor 230 may detect or contact the detection feature 220 when the fork 172 and the clutch collar actuator mechanism 38 are in the retracted position. The retracted position may correspond to an engage or on position of the clutch collar actuator mechanism 38. The sensor 230 may not detect or contact the detection feature 220 of the fork 172 when the fork 172 and the clutch collar actuator mechanism 38 are in the extended position. The sensor 230 may provide data or a signal indicative of the position of the clutch collar actuator mechanism 38 to a controller or monitoring system to facilitate monitoring and/or control of the clutch collar actuator mechanism 38.

Operation of the clutch collar actuator mechanism 38 will now be discussed. A pressurized fluid source 240 may be associated with the axle assembly 10. The pressurized fluid source 240 may provide a pressurized fluid to actuate the actuator. The pressurized fluid source 240 may be fluidly connected to the actuator. In at least one embodiment, the pressurized fluid source 240 may be fluidly connected to a first port 242. The first port 242 may be provided with the differential carrier 20 or the axle housing 22. The first port 242 may provide access to the inside of the axle assembly 10. The first port 242 may be fluidly connected to or may receive a conduit 244. The conduit 244, which may be a hose or tube, may be at least partially disposed inside the axle assembly 10 and may be fluidly connected to the actuator. For instance, the conduit 244 may be fluidly connected to a second port 246. The second port 246 may be provided with the bearing cap 36. For instance, the second port 246 may be fluidly connected to the chamber 136 of the second portion 128. Pressurized fluid from the pressurized fluid source 240 may be provided to the chamber 136 to actuate the actuator 170 from the extended position to the retracted position or to the right from the perspective shown in FIG. 3 as shown in solid lines. The clutch collar 34 may be engaged with the differential unit 28 when the actuator 170 is in the retracted position. Releasing or venting pressurized fluid from the chamber 136 may allow the piston 180 to move from the retracted position to the extended position under the biasing force of the biasing member 184. The extended position is shown in phantom in FIG. 3. Movement of the piston 180 to the left from the perspective shown may be inhibited when the piston 180 engages the step surface 142. The clutch collar 34 may be disengaged from the differential unit 28 when the actuator 170 and the fork 172 are in the extended position. Actuation of the clutch collar 34 may or may not be operator controlled and the clutch collar may be actuated when the vehicle is stationary or moving.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   first and second output shafts;
   a differential unit that controls rotation of the first output shaft with respect to the second output shaft;
   a clutch collar moveably disposed on the first output shaft;
   a bearing that rotatably supports the differential unit;
   a differential carrier that supports the bearing;
   a bearing cap fixedly disposed on the differential carrier, the bearing cap including:
      a first portion that cooperates with the differential carrier to define an opening that receives the bearing;
      a second portion that extends from the first portion, wherein the second portion receives an actuator that extends along an actuator axis and actuates the clutch collar, and
      an anti-rotation feature extending away from the first portion; and
   a fork that operatively connects the actuator to the clutch collar, wherein the fork has a fork opening that receives the anti-rotation feature, wherein the anti-rotation feature limits rotation of the fork about the actuator axis.

2. The axle assembly of claim 1 wherein the anti-rotation feature is disposed between the actuator and the clutch collar.

3. The axle assembly of claim 1 wherein the fork includes:
   first and second prongs disposed proximate a first end of the fork, and
   a fork mounting feature disposed proximate a second end of the fork that is disposed opposite the first end, wherein the fork opening is disposed between the first and second prongs and the fork mounting feature.

4. The axle assembly of claim 3 wherein the fork includes a first fork portion that includes the first and second prongs, a second fork portion that includes the fork mounting feature, and first and second arms that extend from the first fork portion to the second fork portion, wherein the fork opening is disposed between the first and second arms.

5. The axle assembly of claim 4 wherein the fork opening is disposed between the first fork portion and the second fork portion, wherein the first fork portion is disposed substantially parallel to the second fork portion.

6. The axle assembly of claim 1 wherein the first portion is disposed between the differential carrier and the second portion.

7. The axle assembly of claim 6 wherein the first portion has first and second fastener holes that are disposed on opposite sides of the bearing that receive first and second fasteners that couple the bearing cap to the differential carrier, wherein the second portion is disposed between the first and second fastener holes.

8. The axle assembly of claim 1 wherein the actuator moves the fork between an extended position and a retracted position, wherein the clutch collar is disengaged from the differential unit when the fork is in the extended position and the clutch collar engages the differential unit when the fork is in the retracted position.

9. The axle assembly of claim 4 wherein the second portion has a chamber that receives the actuator and the actuator includes a piston that is moveably disposed within the chamber and that is connected to the fork.

10. The axle assembly of claim 9 wherein the piston engages the fork and is connected to the fork with a fork mounting feature that extends through the fork to the actuator.

11. The axle assembly of claim 9 wherein the second portion has a groove that extends around the piston, wherein the groove receives a biasing member that exerts a biasing force on the fork to bias the clutch collar to disengage the differential unit.

12. The axle assembly of claim 11 wherein the groove is spaced apart from the chamber.

13. The axle assembly of claim 11 wherein the second portion has a first inner surface and a second outer surface that is disposed opposite the first inner surface, wherein the first inner surface and the second outer surface cooperate to define the groove.

14. The axle assembly of claim 9 wherein the differential carrier includes a first port that is configured to receive a pressurized fluid and the second portion includes a second port that is fluidly connected to the chamber, wherein the first port is fluidly connected to the second port with a conduit.

15. The axle assembly of claim 9 wherein the actuator has a fork mounting feature that couples the fork to the piston and a biasing member that extends between the second portion and the fork, wherein the biasing member exerts a biasing force on the fork to disengage the clutch collar from the differential unit.

16. The axle assembly of claim 15 wherein the second portion has a groove that extends around the piston and the fork mounting feature, wherein the groove receives the biasing member.

17. The axle assembly of claim 1 wherein the differential carrier is disposed on an axle housing and cooperates with the axle housing to define a cavity, wherein the clutch collar, bearing, bearing cap, fork and the differential unit are disposed in the cavity and the differential unit controls rotation of the first output shaft with respect to the second output shaft.

18. The axle assembly of claim 1 wherein the actuator is moveable between an extended position in which the clutch collar is disengaged from the differential unit and a retracted position in which the clutch collar engages the differential unit.

19. The axle assembly of claim 1 wherein the differential unit supports a ring gear and the second portion is disposed between the ring gear and the fork.

20. The axle assembly of claim 1 further comprising a sensor disposed in the differential carrier, wherein the fork includes first and second prongs that are disposed proximate the clutch collar, wherein the first prong includes a detection feature that is disposed at an end of the first prong, wherein the sensor detects the detection feature.

* * * * *

UNITED STATES PATENT AND TRADEMARK OFFICE
CERTIFICATE OF CORRECTION

PATENT NO. : 9,989,139 B2
APPLICATION NO. : 14/742739
DATED : June 5, 2018
INVENTOR(S) : Robert J. Martin et al.

Page 1 of 1

It is certified that error appears in the above-identified patent and that said Letters Patent is hereby corrected as shown below:

Column 10, Line 48, Claim 9:
After "The axle assembly of claim"
Delete "4" and
Insert -- 8 --.

Signed and Sealed this
Twenty-first Day of August, 2018

Andrei Iancu
*Director of the United States Patent and Trademark Office*